(12) United States Patent
Joo et al.

(10) Patent No.: US 9,806,348 B2
(45) Date of Patent: Oct. 31, 2017

(54) SELF-SUPPORTED CATALYST AND METHOD FOR MANUFACTURING THE SAME

(71) Applicant: UNIST Academy-Industry Research Corporation, Ulsan (KR)

(72) Inventors: Sang Hoon Joo, Ulsan (KR); Jae Yeong Cheon, Ulsan (KR)

(73) Assignee: UNIST (ULSAN NATIONAL INSTITUTE OF SCIENCE AND TECHNOLOGY), Ulsan (KR)

(*) Notice: Subject to any disclaimer, the term of this patent is extended or adjusted under 35 U.S.C. 154(b) by 155 days.

(21) Appl. No.: 14/057,306

(22) Filed: Oct. 18, 2013

(65) Prior Publication Data

US 2015/0064608 A1    Mar. 5, 2015

(30) Foreign Application Priority Data

Aug. 30, 2013 (KR) .................. 10-2013-0104118

(51) Int. Cl.
 H01M 4/26 (2006.01)
 H01M 4/90 (2006.01)
 H01M 4/86 (2006.01)
 H01M 4/96 (2006.01)

(52) U.S. Cl.
 CPC ....... H01M 4/9083 (2013.01); H01M 4/8605 (2013.01); H01M 4/9008 (2013.01); H01M 4/9041 (2013.01); H01M 4/96 (2013.01)

(58) Field of Classification Search
 CPC ............ H01M 4/9083; H01M 4/8605; H01M 4/9008; H01M 4/9041; H01M 4/96
 See application file for complete search history.

(56) References Cited

U.S. PATENT DOCUMENTS

| | | | |
|---|---|---|---|
| 2003/0139286 A1* | 7/2003 | Van Berge | B01J 23/75 502/174 |
| 2006/0116284 A1* | 6/2006 | Pak | B01J 21/185 502/180 |
| 2007/0042268 A1* | 2/2007 | Pak | B01J 21/18 429/213 |
| 2007/0116625 A1* | 5/2007 | Joo | B01J 21/18 423/445 R |

FOREIGN PATENT DOCUMENTS

| | | |
|---|---|---|
| KR | 10-2004-0073119 | 8/2004 |
| KR | 100708730 | 4/2007 |
| KR | 10-2010-0080420 | 7/2010 |
| KR | 10-2013-0014650 | 2/2013 |

OTHER PUBLICATIONS

Jae Yeong Cheon et al. "Ordered mesoporous porphyrinic carbons with very high electrocatalytic activity for the oxygen reduction reaction", Scientific Reports, 3: 2715, p. 1-8 (Sep. 23, 2013).

* cited by examiner

*Primary Examiner* — Helen O Conley
(74) *Attorney, Agent, or Firm* — Lex IP Meister, PLLC

(57) ABSTRACT

A catalyst consisting of structurally ordered mesoporous carbon containing a transition metal and a method for preparing the same are provided. The method for preparing the catalyst includes forming a mixture of a carbon precursor and structurally ordered mesoporous silica, carbonizing the mixture to form a composite, and removing mesoporous silica from the composite.

3 Claims, 22 Drawing Sheets

SELF-SUPPORTED CATALYST AND METHOD FOR MANUFACTURING THE SAME

CROSS-REFERENCE TO RELATED APPLICATION

This application claims priority to and the benefit of Korean Patent Application No. 10-2013-0104118 filed in the Korean Intellectual Property Office on Aug. 30, 2013, the entire contents of which are incorporated herein by reference.

BACKGROUND OF THE INVENTION (a) Field of the Invention

The present invention relates to a catalyst, and more particularly, to a transition metal-based structurally ordered mesoporous catalyst.

(b) Description of the Related Art

Fuel cells are expected to be one of the most promising power sources for application to portable equipment, small power generation, and transportation because of their high energy conversion efficiency and environment-friendly characteristics such as not emitting pollution.

As a catalyst that stimulates a core reaction in driving these fuel cells, one in which platinum nanoparticles are dispersed in a carbon carrier has been generally used. However, various problems of the platinum-based catalyst, such as deterioration in performance due to agglomeration of the nanoparticles upon long-term use, and limited platinum reserves, are becoming obstacles to the distribution of fuel cells.

Therefore, there is a growing interest in the development of low-cost and high-performance non-platinum-based catalysts that are capable of overcoming drawbacks of the platinum catalysts.

Since it was reported about 50 years ago that molecules having a cobalt-nitrogen coordination structure have activity on the fuel cell catalytic reaction, studies on the non-platinum-based catalysts have been continuously conducted. The non-platinum-based fuel cell catalyst has rich reserves of transition metals (mainly iron or cobalt), nitrogen, and carbon as main components. The non-platinum-based fuel cell catalyst is synthesized by mixing precursors containing those components, followed by high-temperature thermal treatment.

Although performance improvement of the non-platinum-based catalysts has occurred through optimization of the above-mentioned synthetic method over the past few years, non-platinum-based catalysts still remain at a lower level as compared with platinum-based catalysts.

In the process of preparing these transition metal-based catalysts, methods of using carriers such as carbon black and the like have been widely used in order to overcome a low surface area.

Although the use of the carrier such as carbon black is effective in increasing the active surface area, carbon black without activity accounts for most of the mass of the carrier itself, causing deterioration in mass activity thereof. Moreover, micropores present in the carbon black are disadvantageous in the mass transfer of reactants and products.

Further, since it has been known that the performance is more improved when thermal treatment is conducted in the condition of a reactive gas such as ammonia than in the condition of an inactive gas such as argon or nitrogen, the synthesis conditions may be somewhat severe.

SUMMARY OF THE INVENTION

The present invention has been made in an effort to provide a catalyst in which a transition metal is contained in structurally ordered mesoporous carbon.

An exemplary embodiment of the present invention provides a catalyst consisting of structurally ordered mesoporous carbon containing a transition metal.

An average diameter of mesopores in the catalyst may be 2 to 30 nm.

The catalyst may have a specific surface area of 200 to 2000 $m^2/g$ and a pore volume of 1.0 to 2.0 $cm^3/g$.

At the time of X-ray diffraction analysis of the catalyst, a main peak of the Bragg angle (2θ) with respect to a Cu-Kα X-ray at a wavelength of 1.541 Å may be exhibited at 0.5° to 1.5°.

Another embodiment of the present invention provides a method for preparing a catalyst consisting of structurally ordered mesoporous carbon containing a transition metal, the method including: forming a mixture of a carbon precursor and structurally ordered mesoporous silica; carbonizing the mixture to form a composite; and removing mesoporous silica from the composite.

A content of the structurally ordered mesoporous silica which will be mixed with the carbon precursor may be 50 to 200 parts by weight based on 100 parts by weight of the carbon precursor.

A temperature for carbonizing the mixture may be 600 to 1000° C.

The transition metal may be at least one selected from the group consisting of iron (Fe), cobalt (Co), nickel (Ni), and copper (Cu).

A content of the transition metal may be 1 to 10 parts by weight based on 100 parts by weight of the structurally ordered mesoporous carbon.

Yet another embodiment of the present invention provides an electrode for a fuel cell, the electrode including the catalyst.

The electrode may be a cathode.

Yet another embodiment of the present invention provides a fuel cell including an electrode containing the catalyst.

According to an embodiment of the present invention, the transition metal-based structurally ordered mesoporous carbon catalyst can form a wide surface area without a separate carbon carrier.

Further, when the transition metal-based structurally ordered mesoporous carbon catalyst prepared according to the present invention is used, a fuel cell having improved performance and stability can be manufactured even without using a high-cost platinum catalyst.

DETAILED DESCRIPTION OF THE EMBODIMENTS

Figure 1:
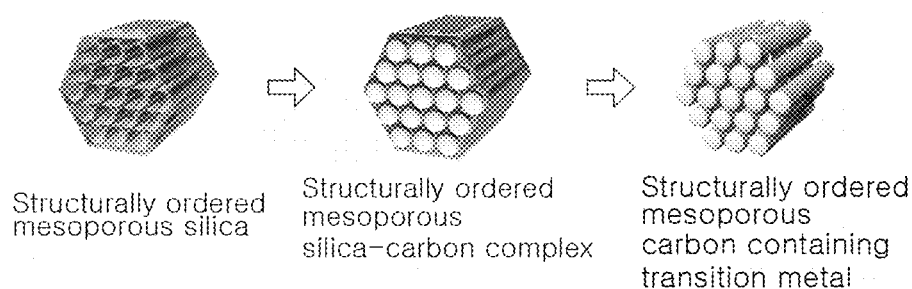
FIG. 1 is a diagram conceptually showing a procedure for preparing structurally ordered mesoporous carbon containing a transition metal according to an exemplary embodiment of the present invention.

Advantages and features of the present invention and methods of accomplishing the same may be understood more readily by reference to the following detailed description of the embodiments and the accompanying drawings. However, the present invention may be embodied in many different forms, and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

A catalyst consisting of structurally ordered mesoporous carbon containing a transition metal according to a preferred exemplary embodiment of the present invention will be described.

FIG. 1 is a diagram conceptually showing a procedure of preparing a catalyst consisting of a structurally ordered mesoporous carbon containing a transition metal according to an exemplary embodiment of the present invention.

A catalyst of the present invention is characterized by containing a transition metal in structurally ordered mesoporous carbon.

A nanocomposite according to the present invention retains mesopores as well as micropores, unlike the conventional amorphous type of microporous carbon powder.

Here, according to the definition by IUPAC, the term "micropores" generally means pores having a diameter of about 2 nm or smaller, and the term "mesopores" mean pores having a diameter of 2 to 50 nm.

The mesopores are characterized by having an average diameter of 2 to 30 nm.

The nanocomposite has a specific surface area of 200~2000 $m^2/g$.

Since a structurally ordered mesoporous carbon-carbon nanotube nanocomposite of the present invention has a structure in which pores of structurally ordered mesoporous carbon are regularly arranged, the X-ray diffraction analysis shows that the main peak of the Bragg angle (2θ) with respect to a Cu-Kα X-ray at a wavelength of 1.541 Å is exhibited at at least 0.5° to 1.5°.

Figure 2:
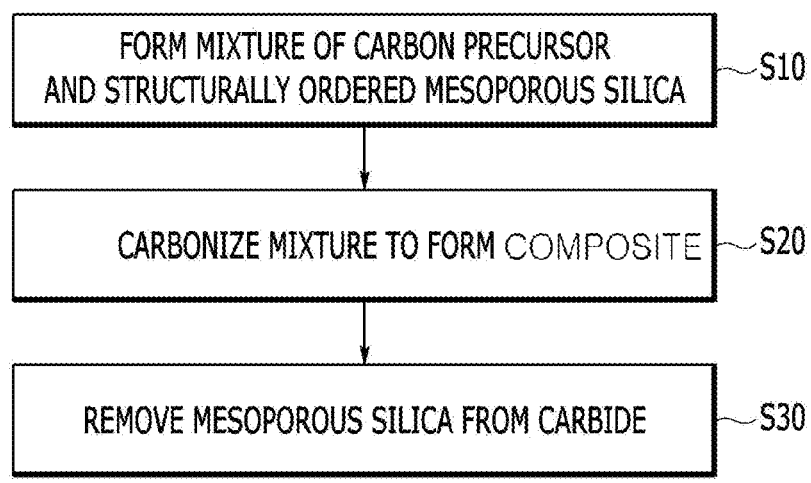
FIG. 2 is a process flowchart showing a procedure for preparing structurally ordered mesoporous carbon containing a transition metal according to the present invention.

FIG. 2 is a process flowchart showing a procedure for preparing structurally ordered mesoporous carbon containing a transition metal according to the present invention.

A method for preparing a catalyst consisting of structurally ordered mesoporous carbon containing transition metal includes: forming a mixture of a carbon precursor and structurally ordered mesoporous silica (S10); carbonizing the mixture to form a composite (S20); and removing mesoporous silica from the composite (S30).

Hereinafter, the catalyst consisting of structurally ordered mesoporous carbon containing a transition metal according to the present invention will be described in detail. However, the following examples are only for illustrating the present invention, and the scope of the present invention is not limited to the following examples.

Example 1: Structurally Ordered Mesoporous Carbon Containing Iron and Cobalt 0.5 g of iron porphyrin, 0.5 g of cobalt porphyrin, and 1 g of SBA-15, which is a kind of structurally ordered mesoporous silica, were physically mixed with each other at room temperature. The mixture of iron porphyrin, cobalt porphyrin, and SBA-15 was put in a tube type electric furnace, and then heated under the nitrogen atmosphere to conduct carbonizing at 800° C.

The thus carbonized product (composite) was put in a mixed solution of HF, water, and ethanol, and then stirring was repeatedly conducted to remove SBA-15, thereby preparing structurally ordered mesoporous carbon containing iron and cobalt.

Example 2: Preparation of Structurally Ordered Mesoporous Carbon Containing Iron Structurally ordered mesoporous carbon containing iron was prepared by carbonizing according to the same method as in Example 1, except that only 1.0 g of iron porphyrin as a carbon precursor was used.

Example 3: Preparation of Structurally Ordered Mesoporous Carbon Containing Cobalt Structurally ordered mesoporous carbon containing cobalt was prepared by carbonizing according to the same method as in Example 1, except that only 1.0 g of cobalt porphyrin as a carbon precursor was used.

Example 4: Preparation of Structurally Ordered Mesoporous Carbon Containing Iron and Cobalt Structurally ordered mesoporous carbon containing iron and cobalt was prepared by carbonizing according to the same method as in Example 1, except that MSU-F as structurally ordered mesoporous silica was used.

Example 5: Preparation of Structurally Ordered Mesoporous Carbon Containing Iron and Cobalt Structurally ordered mesoporous carbon containing iron and cobalt was prepared by carbonizing according to the same method as in Example 1, except that KIT-6 as structurally ordered mesoporous silica was used.

Comparative Example 1: Carbon Powder Containing Iron and Cobalt 0.2 g of iron porphyrin, 0.2 g of cobalt porphyrin, and 0.6 g of Ketjen Black, which is a kind of microporous carbon black, were mixed with 30 mL of acetone, and then stirred at room temperature for 2 hours.

After the mixture was dried at 60° C. for 12 hours, the mixture was put in a tube-type electric furnace, and then heated under a nitrogen atmosphere to conduct carbonizing at 800° C.

The carbonized product (composite) was mixed with 0.5 M sulfuric acid at 80° C. and then stirred for 8 hours, thereby preparing a carbon powder containing iron and cobalt.

Comparative Example 2: Preparation of Structurally Ordered Mesoporous Carbon Structurally ordered mesoporous carbon was prepared by carbonizing according to the same method as in Example 1, except that only 1.0 g of porphyrin as a carbon precursor was used.

Comparative Example 3: Pt/C Catalyst

A commercial Pt/C catalyst marketed by the Etek Company was used.

Comparative Example 4: Preparation of Amorphous Carbon Catalyst Containing Iron and Cobalt An amorphous carbon catalyst containing iron and cobalt was prepared by carbonizing according to the same method as in Example 1, except that only 1.0 g of amorphous spherical silica was used instead of mesoporous silica.

Figure 3:
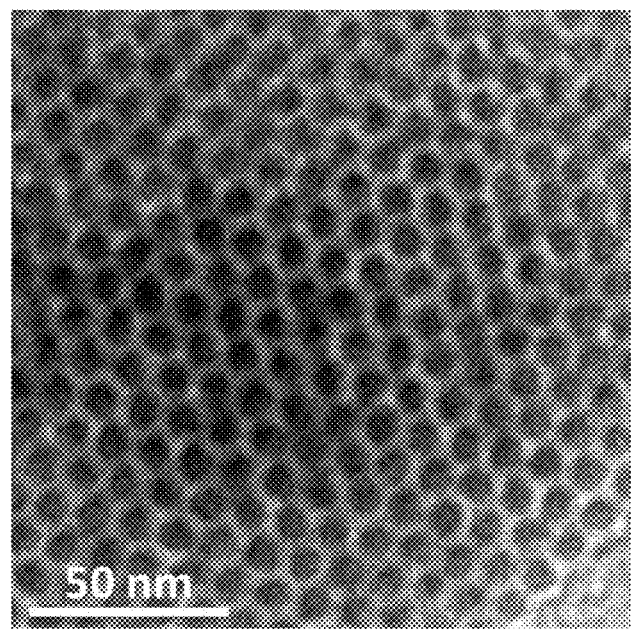
FIG. 3 is a scanning electron microscope image of structurally ordered mesoporous carbon containing a transition metal, which was prepared according to an exemplary embodiment of the present invention.

FIG. 3 is a scanning electron microscope image of structurally ordered mesoporous carbon containing a transition metal, which was prepared according to Example 1 of the present invention. It shows that mesopores are regularly arranged.

Figure 4:
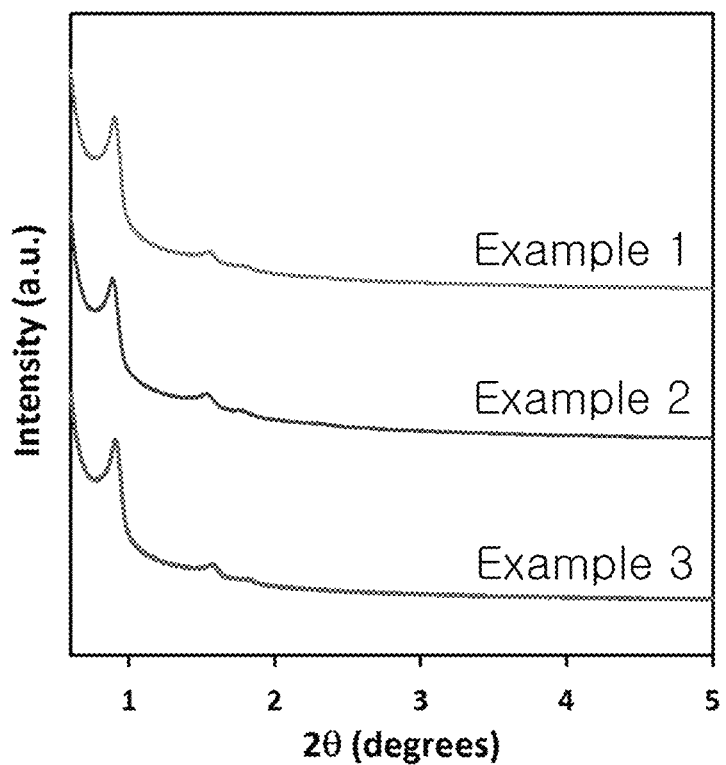
FIG. 4 is a graph showing low-angle X-ray diffraction analysis results of structurally ordered mesoporous carbons containing a transition metal, which were prepared according to Examples 1 to 3 of the present invention.

FIG. 4 is a graph showing low-angle X-ray diffraction results of materials synthesized by Examples 1 to 3. It can be seen that main peaks of structurally ordered mesoporous carbons having a transition metal, which were synthesized by Examples 1 to 3, were all exhibited at 0.9°.

Figure 5:
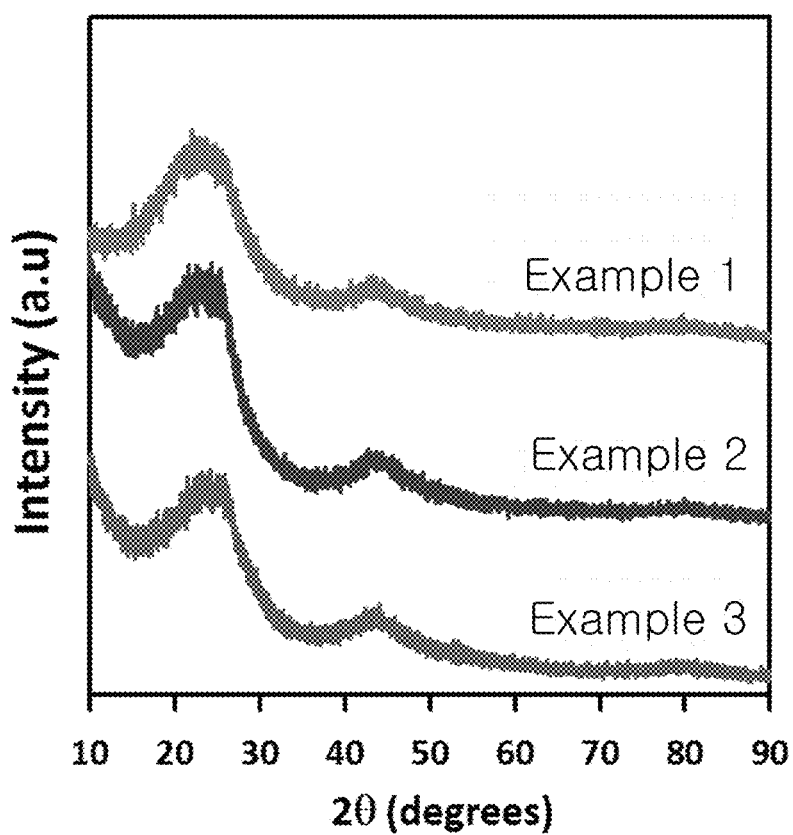
FIG. 5 is a graph showing high-angle X-ray diffraction analysis results of structurally ordered mesoporous carbons containing a transition metal, which were prepared according to Examples 1 to 3 of the present invention.

FIG. 5 is a graph showing high-angle X-ray diffraction results of structurally ordered mesoporous carbons containing a transition metal, which were synthesized by Examples 1 to 3. It can be seen that structurally ordered mesoporous carbons containing transition metal synthesized by Examples 1 to 3 have peaks with wide line widths at about 22° to 26°.

These peaks result from amorphous carbon, which can show that the other crystalline materials are not present.

Figure 6:
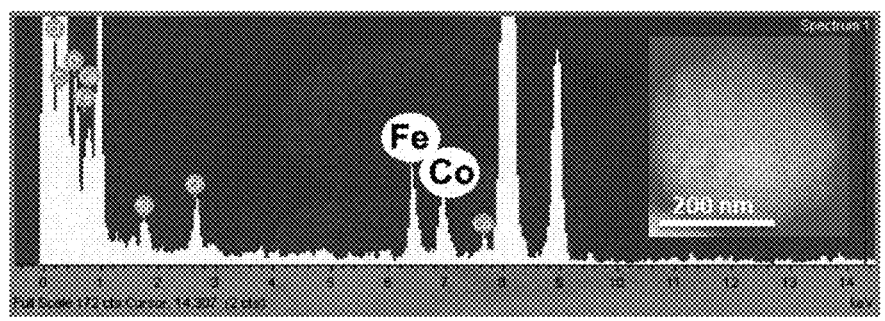
FIG. 6 is a graph showing an energy dispersive X-ray spectroscopy (EDX) result of structurally ordered mesoporous carbon containing a transition metal, which was prepared according to Example 1 of the present invention.

FIG. 6 is a graph showing an energy dispersive X-ray spectroscopy (EDX) result of structurally ordered mesoporous carbon containing a transition metal, which was prepared according to Example 1 of the present invention. It can be seen that transition metals, iron, and cobalt are present at the atomic level throughout the structurally ordered mesoporous carbon.

Figure 7:
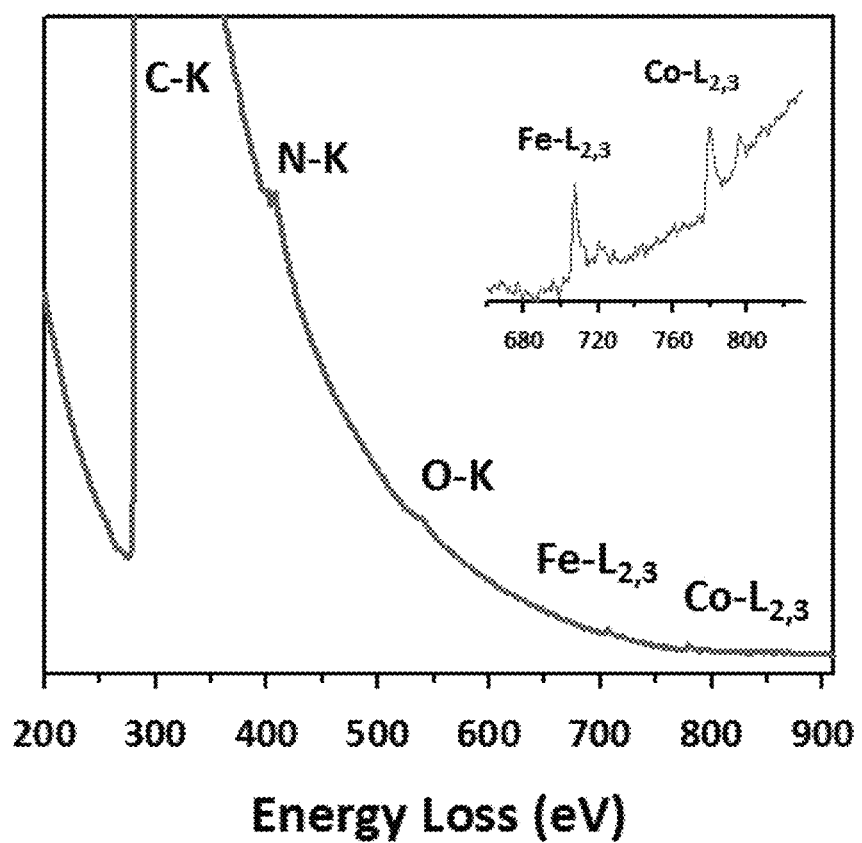
FIG. 7 is a graph showing an electron energy loss spectroscopy (EELS) result of structurally ordered mesoporous carbon containing transition metal, which was prepared according to Example 1 of the present invention.

FIG. 7 is a graph showing an electron energy loss spectroscopy (EELS) result of structurally ordered mesoporous carbon containing a transition metal, which was prepared according to Example 1 of the present invention. It can be seen that the transition metals and nitrogen atoms are distributed at the atomic level.

Figure 8:
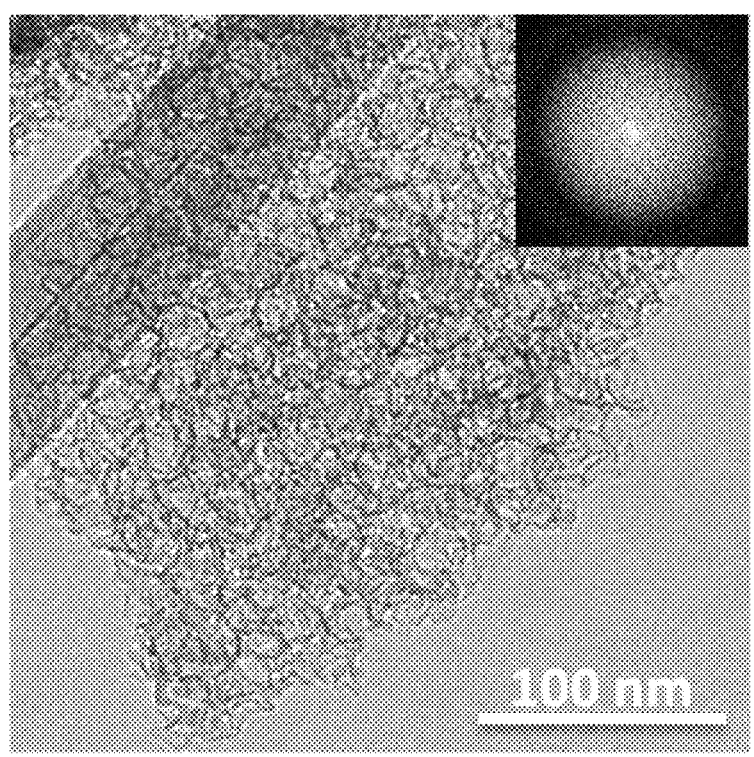
FIG. 8 is a scanning electron microscope image of structurally ordered mesoporous carbon containing a transition metal, which was prepared according to Example 4 of the present invention.

FIG. 8 is a scanning electron microscope image of structurally ordered mesoporous carbon containing a transition metal, which was prepared according to Example 4 of the present invention. It can be seen that spherical-type mesopores are developed.

Figure 9:
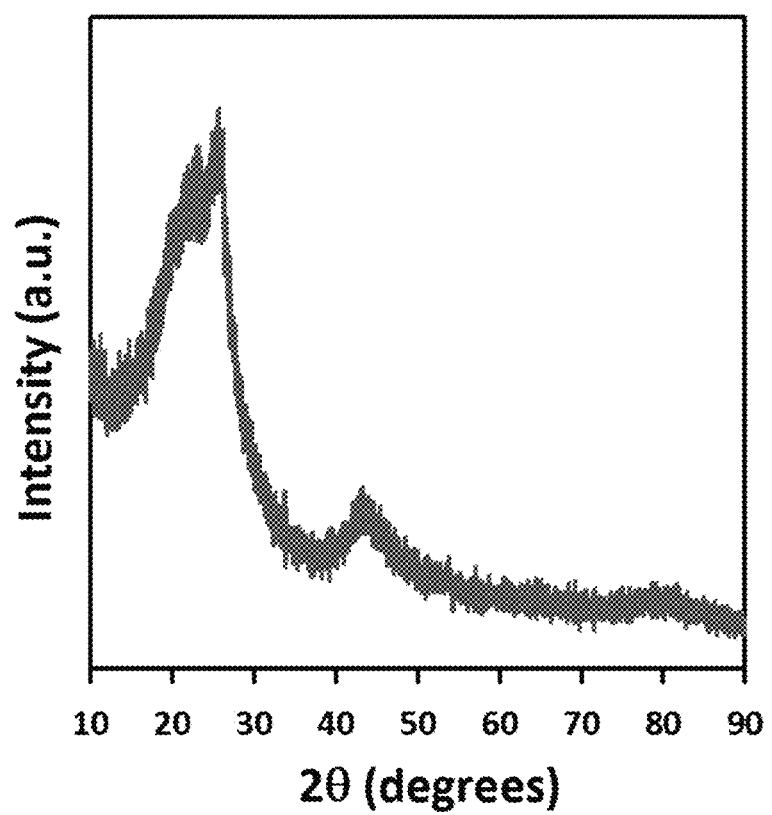
FIG. 9 is a graph showing a high-angle X-ray diffraction analysis result of structurally ordered mesoporous carbon containing a transition metal, which was prepared according to Example 4 of the present invention.

FIG. 9 is a graph showing a high-angle X-ray diffraction analysis result of structurally ordered mesoporous carbon containing a transition metal, which was prepared according to Example 4 of the present invention. It can be seen that other crystalline materials are not present from a peak with a wide line width, which is exhibited at around 22° to 26° due to amorphous carbon.

Figure 10:
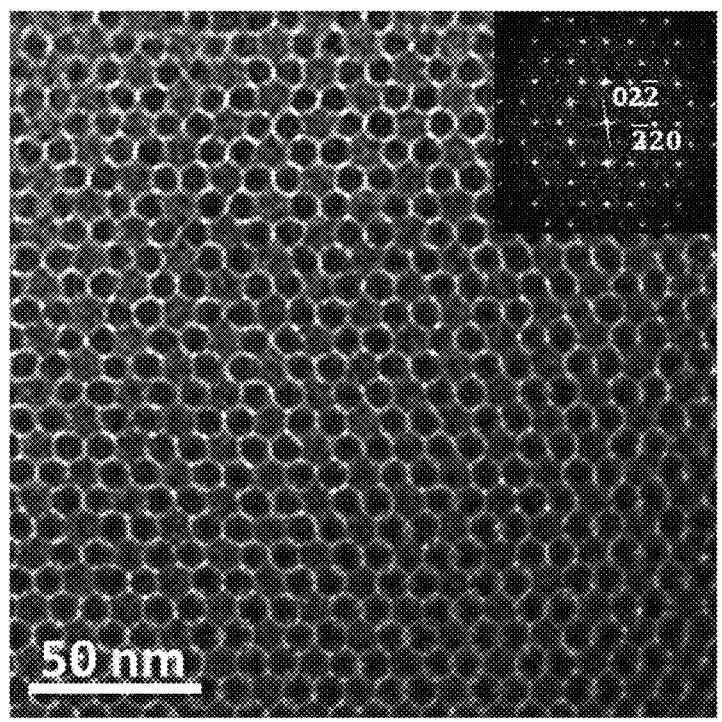
FIG. 10 is a scanning electron microscope image of structurally ordered mesoporous carbon containing a transition metal, which was prepared according to Example 5 of the present invention.

FIG. 10 is a scanning electron microscope image of structurally ordered mesoporous carbon containing a transition metal, which was prepared according to Example 5 of the present invention.

Figure 11:
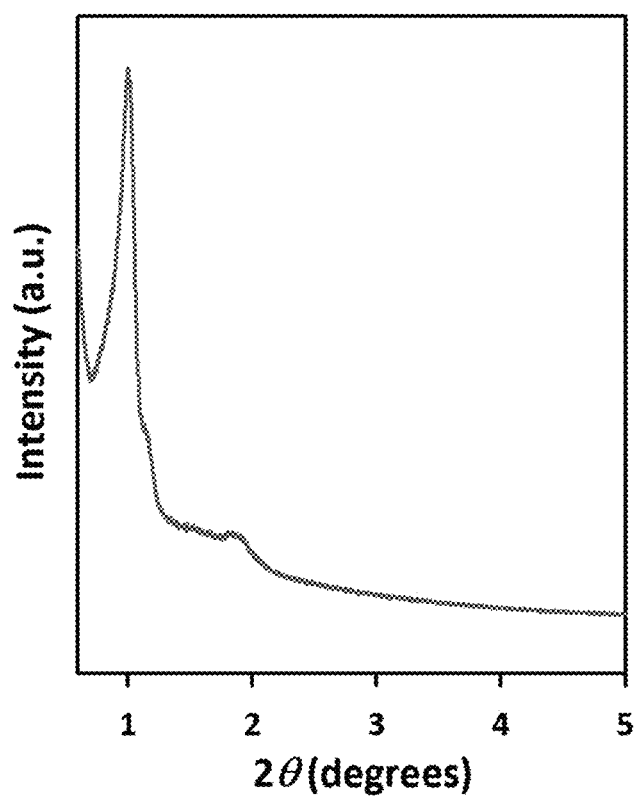
FIG. 11 is a graph showing a low-angle X-ray diffraction analysis result of structurally ordered mesoporous carbon containing a transition metal, which was prepared according to Example 5 of the present invention.

FIG. 11 is a graph showing a low-angle X-ray diffraction analysis result of structurally ordered mesoporous carbon containing a transition metal, which was prepared according to Example 5 of the present invention.

Figure 12:
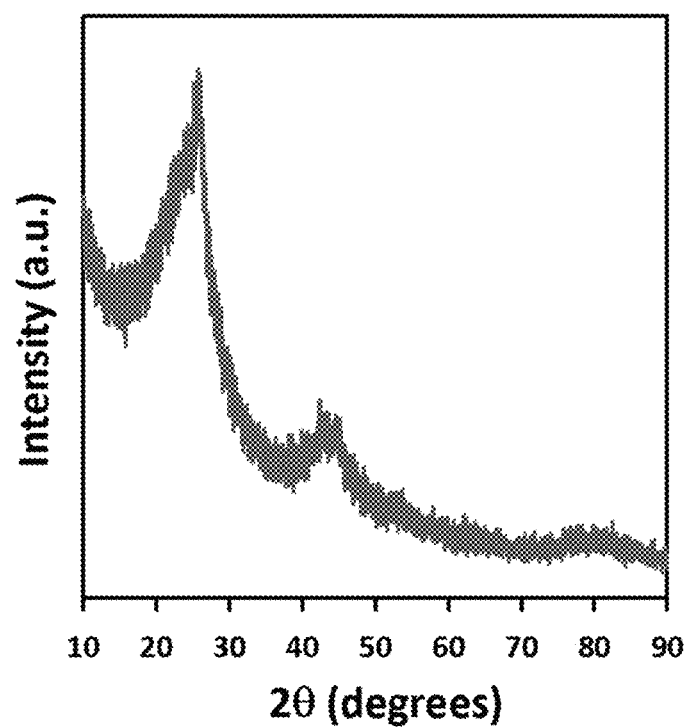
FIG. 12 is a graph showing a high-angle X-ray diffraction analysis result of structurally ordered mesoporous carbon containing a transition metal, which was prepared according to Example 5 of the present invention.

FIG. 12 is a graph showing a high-angle X-ray diffraction analysis result of structurally ordered mesoporous carbon containing a transition metal, which was prepared according to Example 5 of the present invention.

Figure 13:
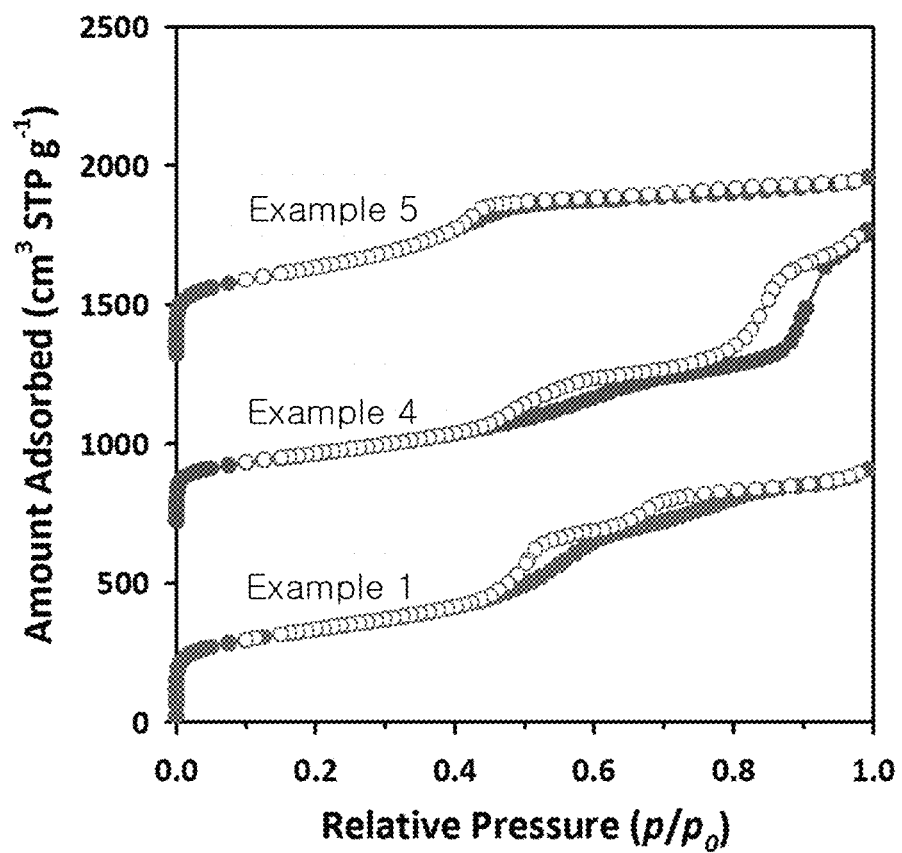
FIG. 13 and FIG. 14 are graphs respectively showing nitrogen adsorption isotherms and pore size distributions of structurally ordered mesoporous carbons containing a transition metal, which were prepared according to Examples 1, 4, and 5 of the present invention.
Figure 14:
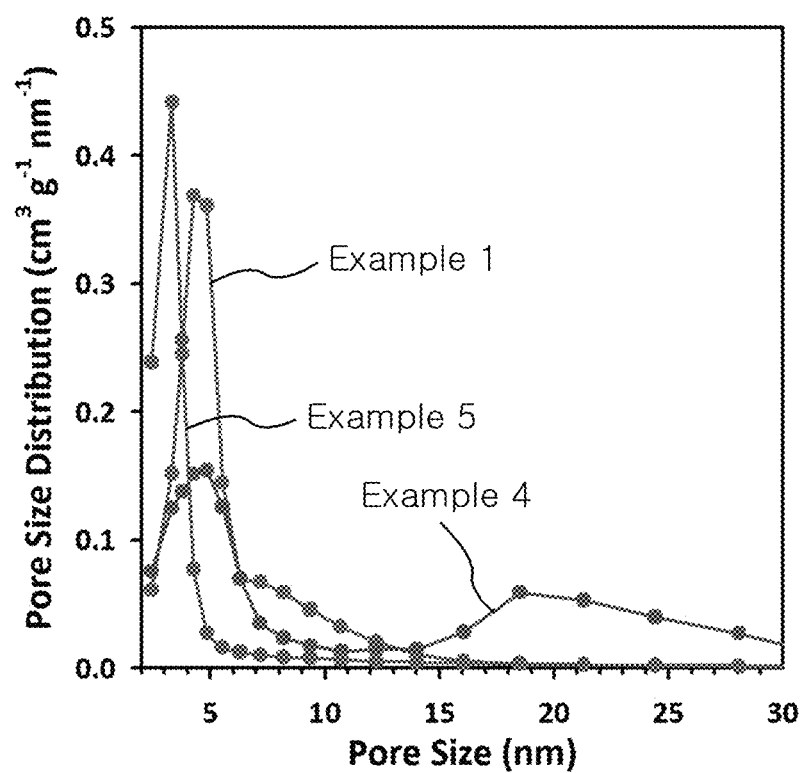

FIG. 13 and FIG. 14 are graphs respectively showing nitrogen adsorption isotherms and pore size distributions. It can be seen that structurally ordered mesoporous carbons containing a transition metal, which were prepared according to Examples 1, 4, and 5 of the present invention, show nitrogen adsorption isotherms exhibiting characteristics of a mesoporous material and pore size distributions corresponding thereto.

Specific surface area values, pore volume values, and pore diameter values of materials for Examples 1, 4, and 5 are tabulated in Table 1.

TABLE 1

|  | BET surface area ($m^2/g$) | Pore volume ($cm^3/g$) | Pore diameter (nm) |
|---|---|---|---|
| Example 1 | 1189 | 1.40 | 4.3 |
| Example 4 | 930 | 1.65 | 4.9, 18.5 |
| Example 5 | 1182 | 1.02 | 3.3 |

Figure 15:
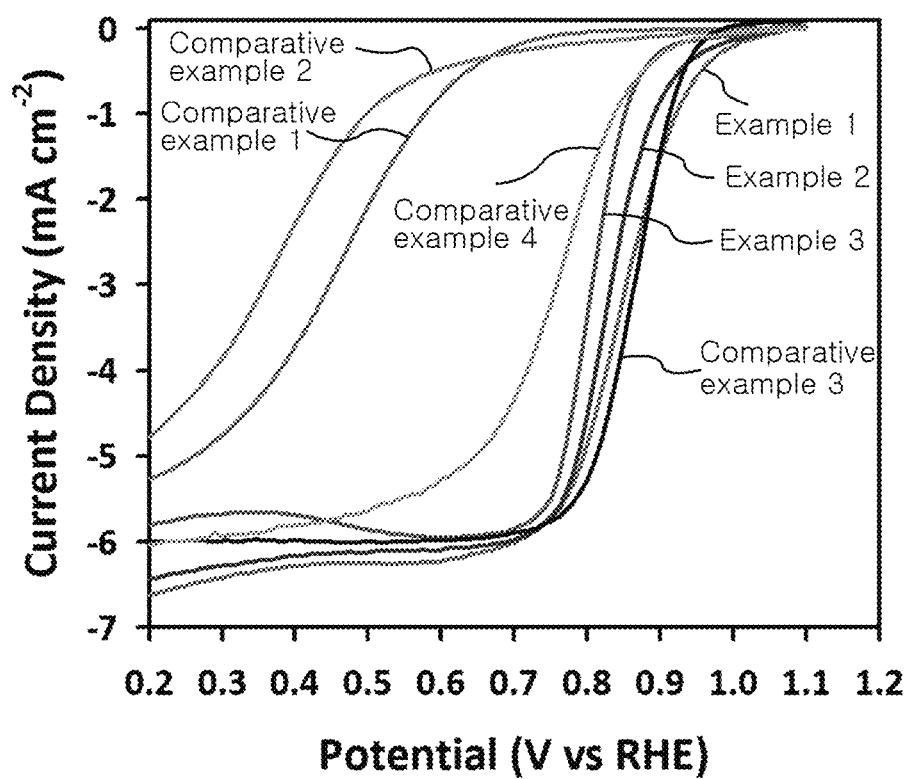
FIG. 15 and FIG. 16 are graphs showing ORR half-cell test results of catalysts which were prepared according to Examples 1 to 3 and Comparative Examples 1 to 4 of the present invention.
Figure 16:
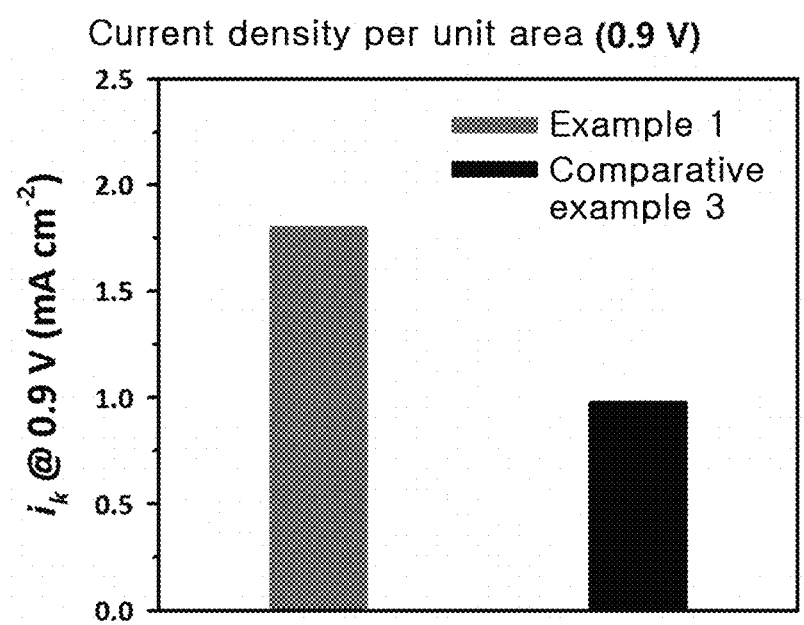

FIG. 15 and FIG. 16 are graphs showing ORR half-cell test results of catalysts which were prepared according to Examples 1 to 3 and Comparative Examples 1 to 4 of the present invention. Corresponding current density values per unit area are tabulated in Table 2.

TABLE 2

|  | Example 1 | Comparative Example 3 |
|---|---|---|
| $mA/cm^2$ | 1.80 | 1.00 |

Figure 17:
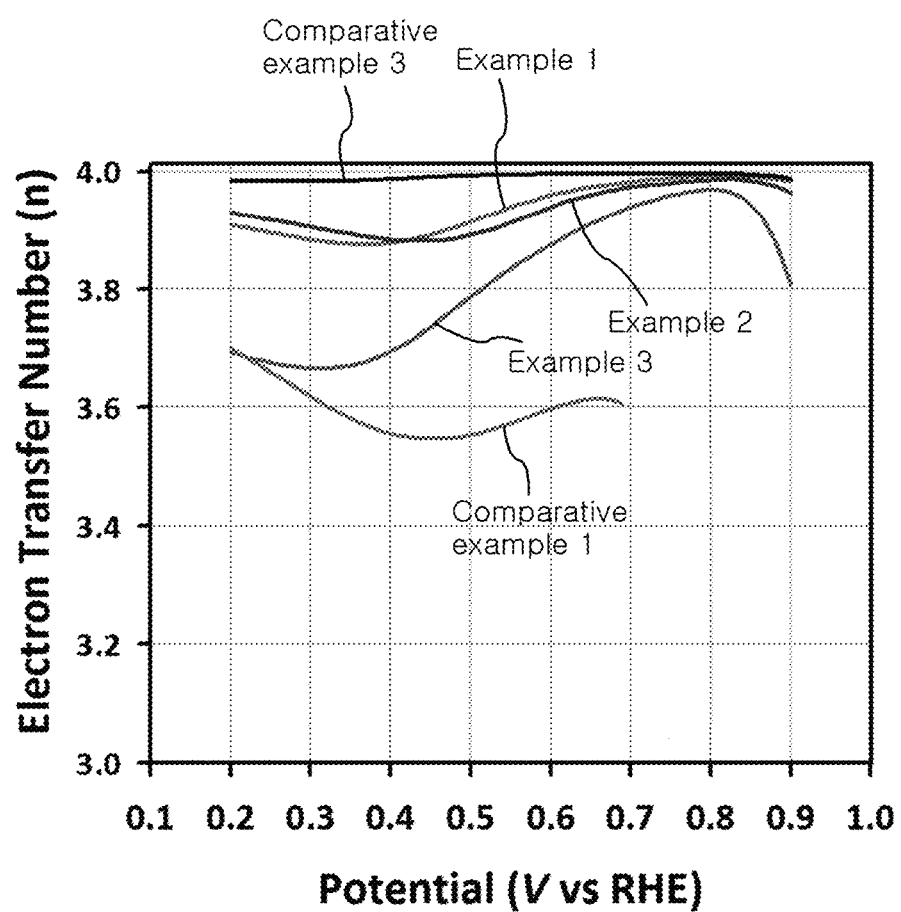
FIG. 17 is a graph showing electron transfer numbers of catalysts which were prepared according to Examples 1 to 3 and Comparative Examples 1 and 3 of the present invention.

FIG. 17 is a graph showing electron transfer numbers of catalysts which were prepared according to Examples 1 to 3 and Comparative Examples 1 and 3 of the present invention. It can be seen that non-platinum based catalysts prepared by Examples 1 to 3 of the present invention have similar selectivity to that of the commercial platinum catalyst.

Figure 18:
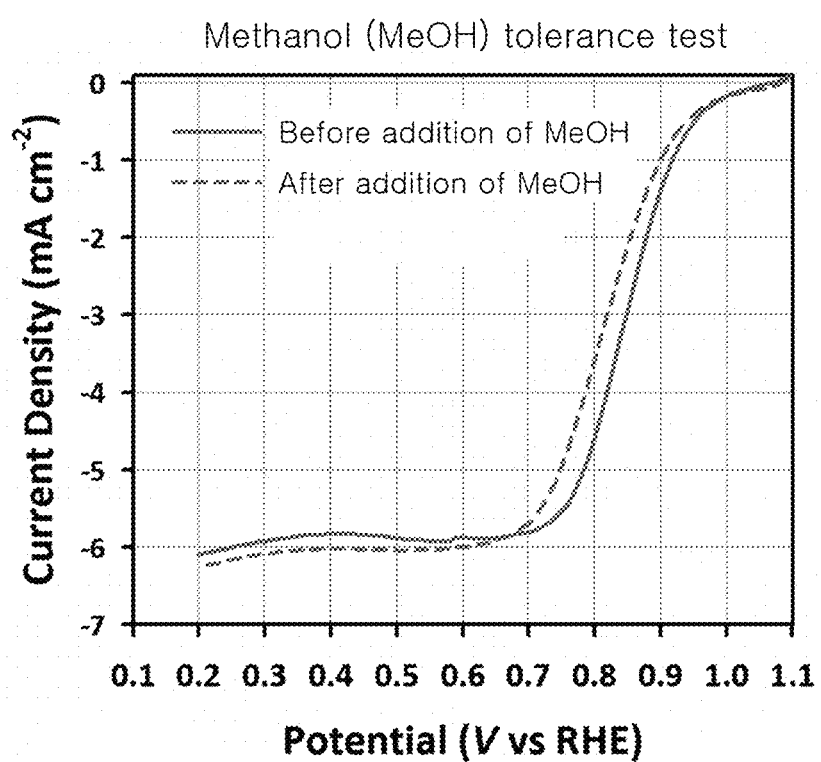
FIG. 18 is a graph showing an ORR activity test result in the presence of methanol of structurally ordered mesoporous carbon containing a transition metal, which was prepared according to Example 1 of the present invention.

FIG. 18 is a graph showing ORR activity test results in the presence of methanol of structurally ordered mesoporous carbon containing a transition metal, which was prepared according to Example 1 of the present invention. It can be seen that the catalyst prepared according to Example 1 of the present invention maintained high ORR activity even in the presence of methanol.

Figure 19:
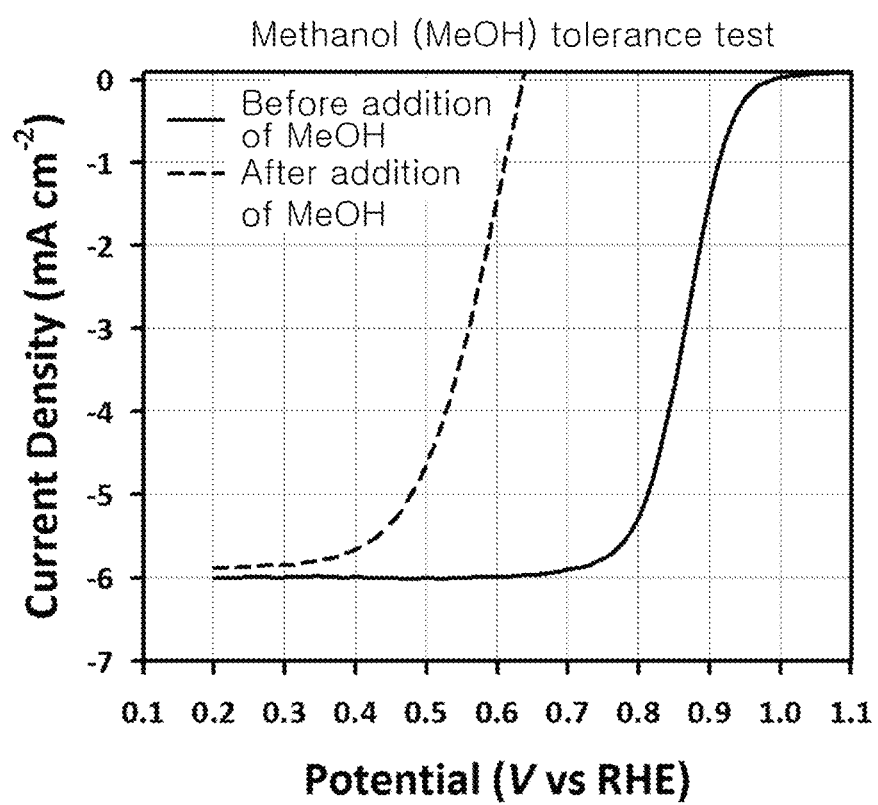
FIG. 19 is a graph showing an ORR activity test result in the presence of methanol of a commercial platinum catalyst which was prepared according to Comparative Example 3 of the present invention.

FIG. 19 is a graph showing ORR activity test results in the presence of methanol of a commercial platinum catalyst which was prepared according to Comparative Example 3 of the present invention. It can be seen that ORR activity of the platinum catalyst is remarkably decreased in the presence of methanol.

Figure 20:
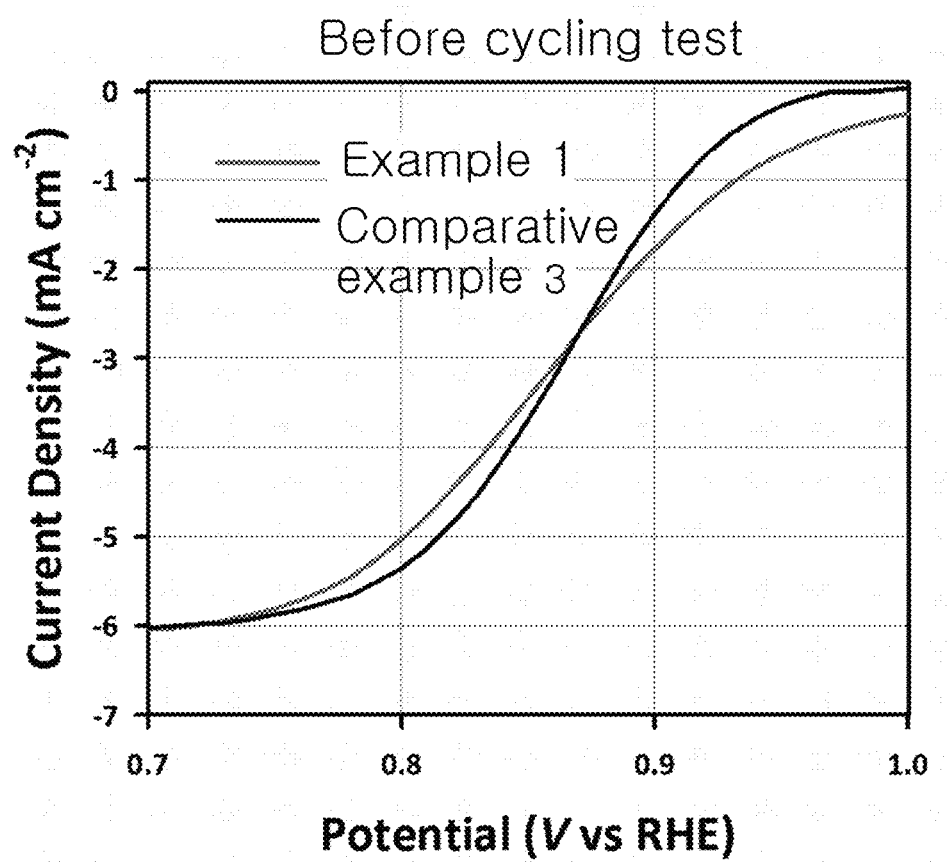
FIG. 20 is a graph showing results before a half-cell cycling test of catalysts which were prepared according to Example 1 and Comparative Example 3 of the present invention.
Figure 21:
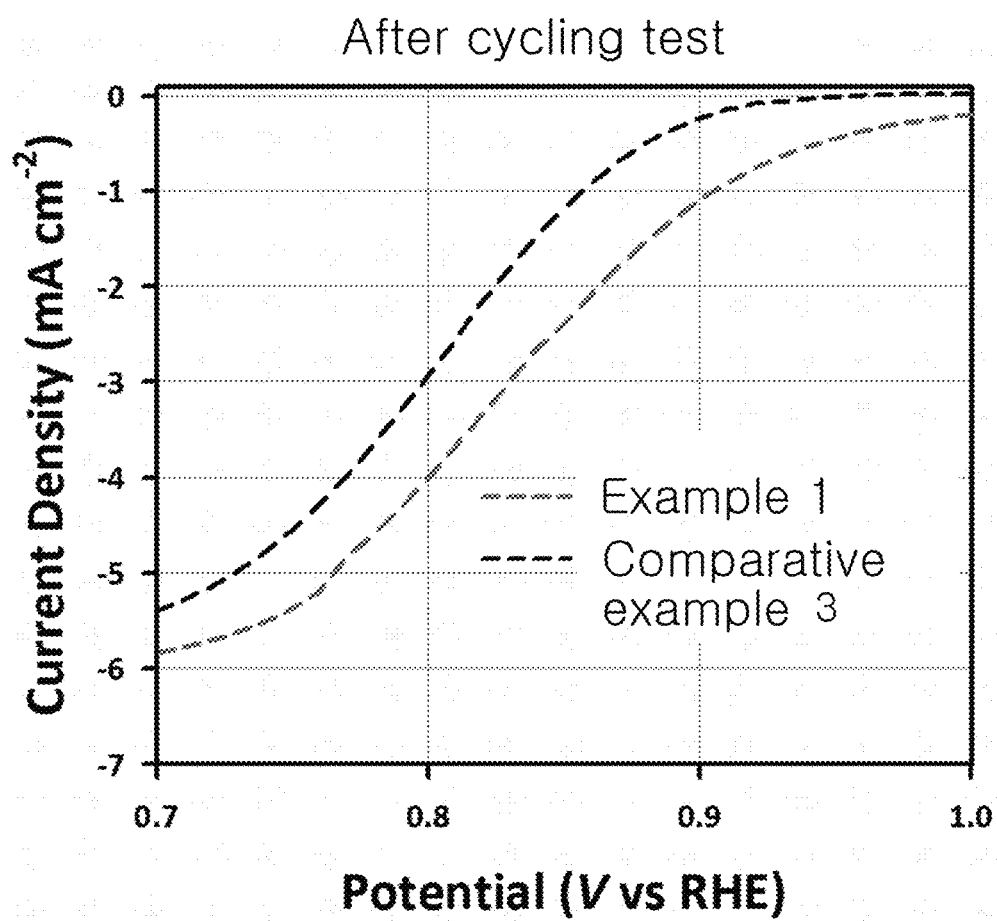
FIG. 21 is a graph showing results after half-cell cycling test of catalysts which were prepared according to Example 1 and Comparative Example 3 of the present invention.

FIG. 20 is a graph showing results before a half-cell cycling test of catalysts which were prepared according to Example 1 and Comparative Example 3 of the present invention, and FIG. 21 is a graph showing results after a half-cell cycling test of catalysts which were prepared according to Example 1 and Comparative Example 3 of the present invention. It can be seen that the structurally ordered mesoporous carbon catalyst containing a transition metal which was prepared by Example 1 of the present invention has higher performance than the commercial platinum catalyst, after the cycling test.

Figure 22:
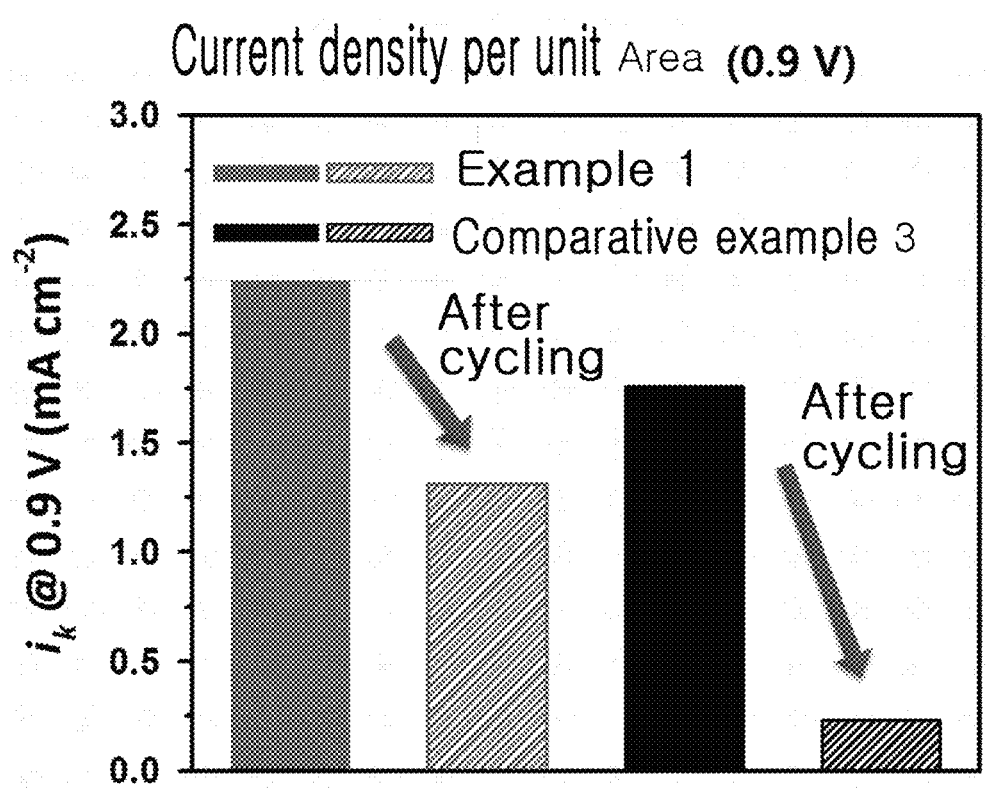
FIG. 22 is a graph comparing results after and before half-cell cycling test of catalysts which were prepared according to Example 1 and Comparative Example 3 of the present invention.

FIG. 22 is a graph comparing results before and after a half-cell cycling test of catalysts which were prepared according to Example 1 and Comparative Example 3 of the present invention. Current density values per unit area therefor are tabulated in Table 3.

TABLE 3

|  | Example 1 | | Comparative Example 3 | |
|---|---|---|---|---|
|  | before | after | before | after |
| $mA/cm^2$ | 2.42 | 1.31 | 1.76 | 0.23 |

In the above, although the embodiments of the present invention have been described with reference to the accompanying drawings, a person skilled in the art to which the present invention pertains should comprehend that the present invention can be embodied in other specific forms without departing from the technical spirit or essential characteristics thereof.

Thus, the embodiments described above should be construed as being exemplary and not limiting the present disclosure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for preparing a non-platinum-based self-supported catalyst consisting of structurally ordered mesoporous carbon containing a transition metal, the method consisting essentially of:
   physically mixing a carbon precursor in a solid state including a transition metal, and structurally ordered mesoporous silica;
   carbonizing the mixture to form a composite; and
   removing mesoporous silica from the composite,
   wherein a content of the structurally ordered mesoporous silica is 50 to 200 parts by weight based on 100 parts by weight of the carbon precursor,
   wherein a content of the transition metal is 1 to 10 parts by weight based on 100 parts by weight of the structurally ordered mesoporous carbon.

2. The method of claim 1, wherein a temperature for carbonizing the mixture is 600 to 1000° C.

3. The method of claim 1, wherein the transition metal is at least one selected from the group consisting of iron (Fe), cobalt (Co), nickel (Ni), and copper (Cu).

* * * * *